US012737639B2

(12) United States Patent
Jung et al.

(10) Patent No.: US 12,737,639 B2
(45) Date of Patent: Sep. 15, 2026

(54) METHOD AND APPARATUS FOR CONTINUOUS LEARNING USING ASYMMETRIC STRUCTURES

(71) Applicant: INFINIQ Co., Ltd., Seoul (KR)

(72) Inventors: Min Jae Jung, Osan-si (KR); Joo Hee Kim, Seongnam-si (KR); Seung Jin Oh, Seongnam-si (KR); Seung Taek Kim, Gwangmyeong-si (KR); Kyung Shil Kang, Seoul (KR)

(73) Assignee: INFINIQ Co., Ltd., Seoul (KR)

( * ) Notice: Subject to any disclaimer, the term of this patent is extended or adjusted under 35 U.S.C. 154(b) by 0 days.

(21) Appl. No.: 19/255,664

(22) Filed: Jun. 30, 2025

(65) Prior Publication Data

US 2026/0087369 A1 Mar. 26, 2026

(30) Foreign Application Priority Data

Sep. 24, 2024 (KR) ........................ 10-2024-0129310

(51) Int. Cl.
*G06N 3/096* (2023.01)

(52) U.S. Cl.
CPC .................................... *G06N 3/096* (2023.01)

(58) Field of Classification Search
CPC ................................ G06N 3/096; G06N 3/08
See application file for complete search history.

(56) References Cited

PUBLICATIONS

Wang et al., Self-Expansion of Pre-trained Models with Mixture of Adapters for Continual Learning, Jun. 2024, 1-23, Retrieved using arXiv from the Internet: <URL:https://arxiv.org/abs/2403.18886> (Year: 2024).*

Ding et al., Sparse Low-rank Adaptation of Pre-trained Language Models, 2023, 1-13, Retrieved using arXiv from the Internet: <URL:https://arxiv.org/abs/2311.11696> (Year: 2023).*

Zhang et al., AdaLoRA: Adaptive Budget Allocation for Parameter-Efficient Fine-Tuning, 2023, 1-17, Retrieved using arXiv from the Internet: <URL:https://arxiv.org/abs/2303.10512> (Year: 2023).*

De Masson d'Autume et al., Episodic Memory in Lifelong Language Learning, 2019, 1-13, Retrieved using arXiv from the Internet: <URL:https://arxiv.org/abs/1906.01076> (Year: 2019).*

(Continued)

*Primary Examiner* — Kakali Chaki
*Assistant Examiner* — Ibrahim Rahman
(74) *Attorney, Agent, or Firm* — Youngil Lee

(57) ABSTRACT

The present invention aims to minimize catastrophic forgetting that occurs during the continual learning process of a large language model (LLM), and to improve the model's performance by efficiently acquiring new knowledge. A memory of a continual learning apparatus using an asymmetric structure according to one embodiment of the present invention may store datasets used for continual learning, model parameters, a router, and adapters. At least one processor may be configured to perform continual learning using a neural network model comprising a shallow layer and a deep layer; to add a new adapter corresponding to new learning to the deep layer whenever new data is learned; and to distribute input text to at least one of the shallow layer, the deep layer, and the adapter via a router provided between the shallow layer and the deep layer.

8 Claims, 10 Drawing Sheets

(56) References Cited

PUBLICATIONS

Jung, Min Jea, et al.; "PMoE: Progressive Mixture of Experts with Asymmetric Transformer for Continual Learning;" Jul. 31, 2024; pp. 1-11.
"Request for the Submission of an Opinion" Office Action issued in KR 10-2024-0129310; mailed by the Korean Intellectual Property Office on Nov. 21, 2024.
"Written Decision on Registration" Office Action issued in KR 10-2024-0129310; mailed by the Korean Intellectual Property Office on Feb. 22, 2025.
Zhong, Yibo, et al.; "Low-Rank Interconnected Adaptation across Layers;" Jul. 13, 2024; pp. 1-25.
Zhu, Jiacheng, et al.; "Asymmetry in Low-Rank Adapters of Foundation Models;" Feb. 27, 2024; 1-17.
Diao, Shizhe, et al.; "Mixture-of-Domain-Adapters: Decoupling and Injecting Domain Knowledge to Pre-trained Language Models' Memories;" Jun. 8, 2023; pp. 1-15.
Yang, Menglin, et al.; "Enhancing LLM Complex Reasoning Capability through Hyperbolic Geometry;" Jul. 27, 2024; pp. 1-14.

* cited by examiner

METHOD AND APPARATUS FOR CONTINUOUS LEARNING USING ASYMMETRIC STRUCTURES

CROSS-REFERENCE TO RELATED APPLICATIONS

This application claims the benefit of Korean Patent Application No. 10-2024-0129310, filed on Sep. 24, 2024, in the Korean Intellectual Property Office, the disclosure of which is incorporated herein in its entirety by reference.

TECHNICAL FIELD

The present invention relates to a technology in the field of deep learning, and more particularly, to a method and an apparatus for alleviating catastrophic forgetting occurring during continual learning in a large language model (LLM) and for effectively acquiring new knowledge during the continual learning process.

BACKGROUND

With recent advances in deep learning technology, large language models (LLMs) have demonstrated remarkable performance in various natural language processing tasks, including text generation, translation, and question answering. However, LLMs suffer from a problem of catastrophic forgetting, in which previously acquired knowledge is lost during the process of learning new tasks.

To utilize LLMs efficiently, it is essential to enable continual learning capabilities that allow the model to retain previously learned knowledge while learning new tasks.

Conventional continual learning methods have limitations in that they fail to completely resolve the issue of catastrophic forgetting or exhibit degraded learning performance on new tasks.

SUMMARY

A memory of a continual learning apparatus using an asymmetric structure according to one embodiment of the present invention may store a dataset used for continual learning, model parameters, a router, and adapters.

At least one processor may be configured to perform continual learning using a neural network model comprising a shallow layer and a deep layer, to add a new adapter corresponding to new learning to the deep layer whenever new data is learned, and to distribute input text to at least one of the shallow layer, the deep layer, and the adapter via a router provided between the shallow layer and the deep layer.

The at least one processor may be configured to distribute the input text based on a feature corresponding to the deep layer via the router.

The at least one processor may be configured to improve parameter efficiency by using Low-Rank Adaptation (LoRA) through the adapter provided in the deep layer, utilizing at least a portion of the neural network model.

The at least one processor may be configured to perform regularization on the adapter to improve the learning efficiency of the neural network model.

The at least one processor may be configured to perform the regularization using an orthogonal loss function in order to maintain the independence of information between different adapters.

The at least one processor may be configured to perform Sparse Low-rank Adaptation (SoRA) based on a gate vector provided between the adapters, and to determine the capacity of each adapter based on the characteristics of the input text.

The at least one processor may be configured to increase the learning speed of the added adapter by adjusting the update of parameters learned prior to a reference point at a predetermined ratio using a Gradient Decoupling Layer (GDL).

The memory may store data samples from tasks prior to a reference point, and the at least one processor may be configured to perform replay based on the data samples.

The at least one processor may be configured to determine a cross-entropy loss between the input text and a corresponding task ID, and to train the router to assign the input text to the adapter based on the cross-entropy loss.

A continual learning method using an asymmetric structure according to one embodiment of the present invention includes storing, by a memory, a dataset used for continual learning, model parameters, a router, and adapters, and performing, by a processor, continual learning using a neural network model comprising a shallow layer and a deep layer.

The performing of the continual learning includes: learning, by the processor, general data in the shallow layer; learning, by the processor, new data, which differs from the general data, in the deep layer; adding, by the processor, a new adapter corresponding to the new learning to the deep layer whenever the new data is learned; and distributing, by the processor, input text to at least one of the shallow layer, the deep layer, and the adapter via a router provided between the shallow layer and the deep layer.

DETAILED DESCRIPTION

Figure 1:
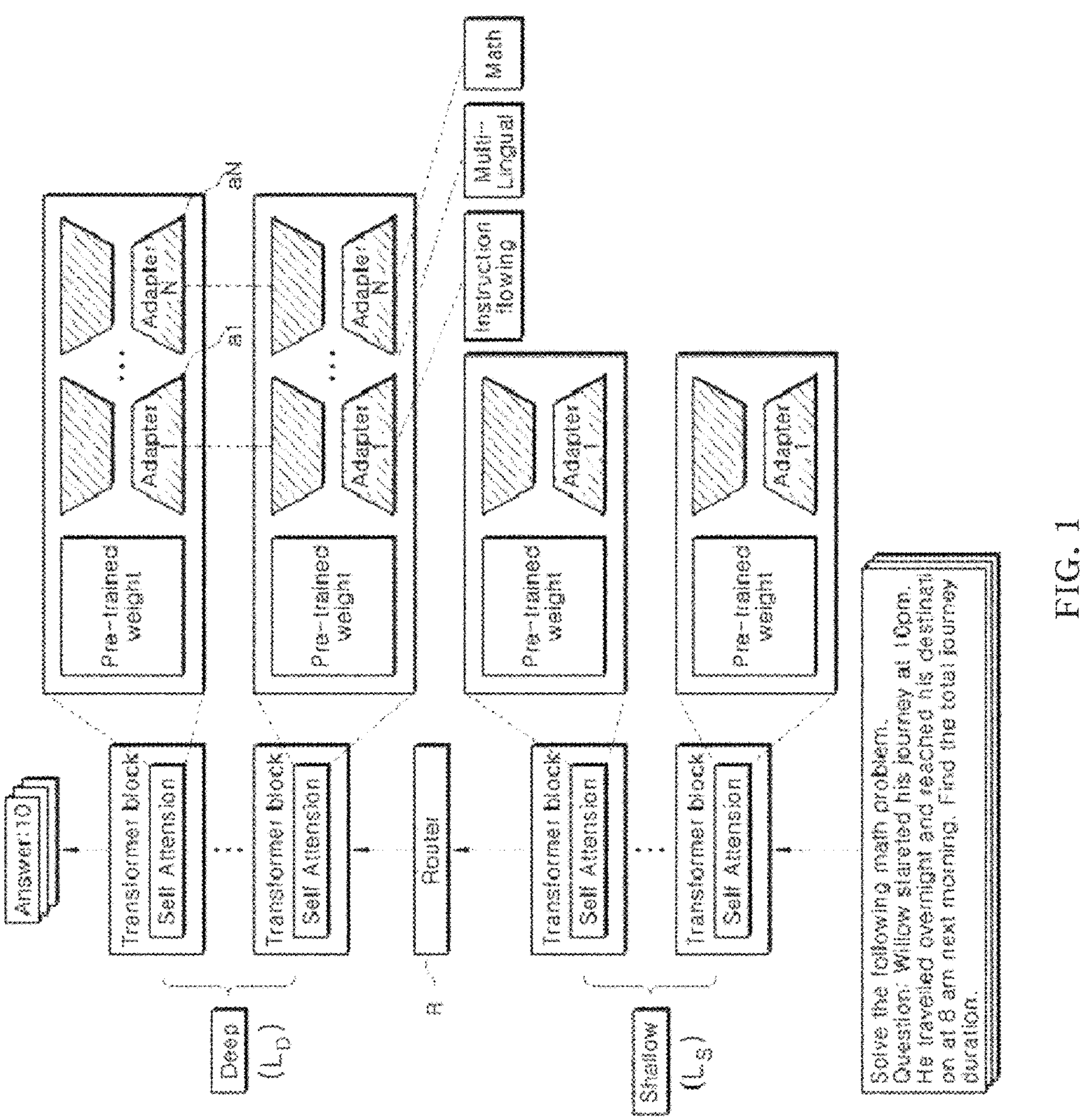
FIG. 1 is a diagram illustrating an overall configuration of a continual learning apparatus using an asymmetric structure according to one embodiment of the present invention.

Throughout the present disclosure, like reference numerals refer to like components. The present disclosure does not describe all elements of the embodiments, and general matters in the relevant technical field or redundant contents among embodiments are omitted.

The terms "unit," "module," "element," and "block" used in the specification may be implemented in software or hardware, and in some embodiments, a plurality of such units, modules, elements, or blocks may be implemented as a single component, or a single unit, module, element, or block may include a plurality of components.

In the present specification, when a part is described as being "connected" to another part, it includes not only direct connections but also indirect connections, where the indirect connection may include a connection through a wireless communication network.

In addition, when a part is described as "including" a certain component, unless explicitly stated otherwise, it does not exclude other components and may further include additional components.

In the present specification, when one element is described as being "on" another element, it includes not only the case where the one element is in contact with the other element, but also the case where another element is interposed between the two elements.

The terms such as first, second, and the like are used merely to distinguish one component from another component, and the components are not limited by the terms.

The singular expressions are intended to include plural forms as well, unless the context clearly indicates otherwise.

In each step, reference numerals are used merely for convenience of explanation, and do not indicate the order of the steps. Unless a specific order is clearly described in the context, the steps may be performed in an order different from that explicitly stated.

The present invention aims to minimize catastrophic forgetting that occurs during the continual learning process of an LLM and to enhance model performance by efficiently learning new knowledge.

The present invention preserves previously acquired knowledge by alleviating catastrophic forgetting occurring during the continual learning process of an LLM.

The present invention improves model performance by efficiently acquiring knowledge for new tasks.

By suppressing catastrophic forgetting and effectively acquiring new knowledge, the present invention facilitates the reuse of a well-trained pretrained model.

The present invention enhances model reusability, thereby saving computational resources and energy required for training LLMs, and improving economic and environmental efficiency.

Hereinafter, the operating principles and embodiments of the present disclosure will be described with reference to the accompanying drawings.

FIG. 1 is a diagram illustrating the overall configuration of a continual learning apparatus using an asymmetric structure, presenting the connections among a memory, a processor, a shallow layer, a deep layer, a router, and adapters, as well as the flow of data.

The figure visually represents the process in which new adapters (a1 . . . aN) are added to the deep layer (Ld) and the process in which input text is distributed to each layer or adapter (a1 . . . aN) via the router (R).

FIG. 1 is a diagram illustrating the overall structure of a Progressive Mixture of Experts with Asymmetric Transformer (PMoE) model and its operation in a continual learning process.

The memory serves to store various types of information required for continual learning. Specifically, it stores datasets for each task, model parameters including pretrained weights and adapters, and the weights of the router (R).

The processor is a core component that reads the data and model information stored in the memory and performs the actual continual learning process.

The processor performs continual learning by utilizing a neural network model composed of a shallow layer and a deep layer.

Among the neural network model, the shallow layers (Ls) are specialized in retaining general knowledge or content learned from previous tasks. Even during the continual learning process, the model structure remains fixed, which helps prevent forgetting of previously acquired knowledge.

Each transformer block may be connected to one or more adapters (LoRA).

The deep layers (Ld) are specialized in learning task-specific knowledge for new tasks.

Each time a new task is learned, an adapter responsible for the specialized knowledge of that task may be added to the deep layers (Ld).

Each transformer block may be connected to multiple adapters, and the router can select an appropriate adapter for a given input text to process the information.

The router (R) is positioned between the shallow layers and the deep layers, and it analyzes the input text and distributes it to a suitable layer or adapter.

The distribution by the router may be determined based on the following equation.

$$G(x) = softmax(x \cdot W_g) \quad \text{[Equation 1]}$$

Referring to Equation 1, G(x) may represent a probability distribution determined by the router, and x may represent an input sequence. Wg may represent a linear layer forming the network of the router.

The router may utilize features of the deep layer to identify the characteristics of the input text and, based on this, distribute the input text to the shallow layer, the deep layer, or a specific adapter.

Each adapter may be specialized for a specific task or type of knowledge and may be responsible for processing information related to that task.

In the deep layer, a new adapter may be added whenever a new task is learned, thereby extending the representational capacity of the model.

Adapters may use Low-Rank Adaptation (LoRA) to increase parameter efficiency. That is, instead of updating the parameters of the entire model, only a small number of parameters are updated and applied to the new task.

The PMoE model can efficiently learn new knowledge while preserving previously acquired knowledge through an asymmetric structure between the shallow layers and the deep layers.

Meanwhile, the self-attention layer constituting a transformer block may be determined based on the following equation.

$$f_{\theta_l+1}(h_l) = \begin{cases} W^l \cdot h_l, & \text{if } l \le \tau \\ W'^l \cdot h_l, & \text{otherwise} \end{cases} \quad \text{[Equation 2]}$$

F may represent a layer constituting the model, and h may represent a forward pass based on the input sequence. $\tau$ denotes the number that determines the deep layer and the shallow layer.

Meanwhile, $W^l$ and $W'^l$ may be determined based on the following equation.

$$W^l = W_0^l + (BA)^l \quad \text{[Equation 3]}$$

$$W'^l = W_0^l + \sum_{k=1}^{T} G(h_\tau)_k \cdot (BA)_k^l \quad \text{[Equation 4]}$$

Equation 3 may represent the configuration of the self-attention layer corresponding to the shallow layer, and Equation 4 may represent the configuration of the self-attention layer corresponding to the deep layer.

A and B, as presented in Equations 3 and 4, may include trainable parameters that constitute the adapter.

By progressively adding adapters to the deep layer (Ld) and distributing input text to appropriate adapters via the router, catastrophic forgetting that occurs during continual learning can be alleviated, and model performance can be improved.

Figure 2:
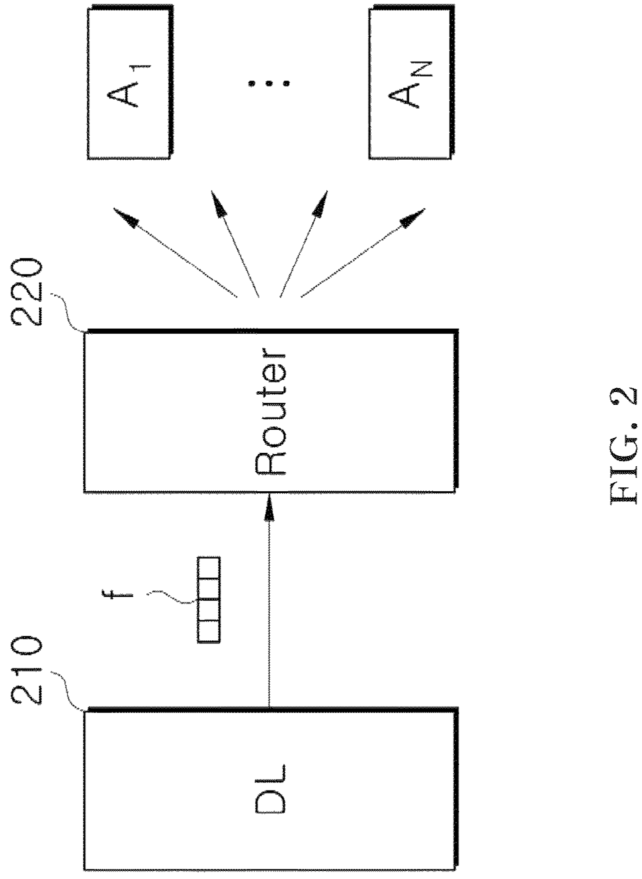
FIG. 2 is a diagram illustrating a process in which a router distributes input text by utilizing features of a deep layer according to one embodiment of the present invention.

FIG. 2 is a diagram illustrating a process in which the router (220) distributes input text by utilizing features of the deep layer (210). A feature vector (f) extracted from the deep layer (210) is delivered to the router, and the router (220) distributes the input text based on the feature vector.

FIG. 2 is a diagram visually illustrating the process in which the router (220) of the PMoE model distributes input text to appropriate adapters by utilizing a feature vector (f) extracted from the deep layer (210). In this figure, the feature vector (f) extracted from the deep layer (210) is delivered to the router (220), and the router (220) distributes the input text based on this feature.

FIG. 2 also explains how the router effectively distributes the input text to adapters by leveraging the features of the deep layer.

The final transformer block of the deep layer (210) processes the input text and generates a feature vector (f) as a result. This feature vector contains the essential semantics and contextual information of the text, playing a crucial role in enabling the router (220) to identify the nature of the input.

The router (220) receives the feature vector (f) generated from the deep layer as input and calculates assignment probabilities for each adapter. This process is performed by analyzing the feature vector and serves as a basis for evaluating the suitability of each adapter.

The router (220) distributes the input text to the most appropriate adapter based on the calculated assignment probabilities (see Equation 1). In this step, the router analyzes the characteristics of the input text using the feature vector (f) and assigns it to an adapter that possesses the most suitable domain knowledge. This process allows the router to recognize the fine-grained characteristics of the input text and effectively select the optimal adapter accordingly.

The PMoE model has a structure in which information is processed more effectively as it flows from the shallow layer to the deep layer through abstraction and integration. This structure enables the feature vector (f) from the deep layer to better reflect the meaning of the input text, allowing the router (220) to distribute the input text more accurately based on this information.

The feature vector (f) extracted from the deep layer enables a clearer interpretation of the complex semantics and context of the text, which allows the router to make more precise distribution decisions.

This feature-based routing mechanism significantly enhances the performance of the router (220), ultimately contributing to the improvement of the continual learning capability of the PMoE model. By precisely analyzing the deep-layer features and accurately assigning the input to the most appropriate adapter, the model can quickly and effectively adapt to continuously incoming data and changing situations. As a result, the overall learning efficiency and performance are improved.

This capability of the PMoE model to demonstrate high flexibility and adaptability in various learning scenarios is one of its core strengths and plays a key role in enhancing the quality of continual learning.

Figure 3:
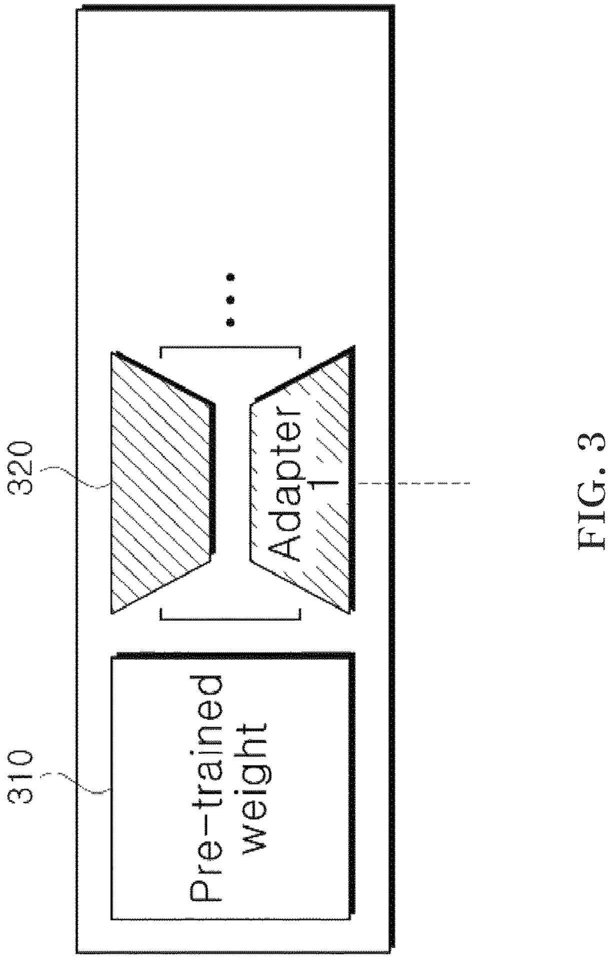
FIG. 3 is a diagram illustrating how an adapter improves parameter efficiency using LoRA according to one embodiment of the present invention.

FIG. 3 is a diagram illustrating in detail the process by which the adapter (320) enhances parameter efficiency using Low-Rank Adaptation (LoRA) technology. This figure depicts the pretrained weights (310) and the internal LoRA structure within the adapter (320), explaining how the structure reduces the number of parameters and improves learning efficiency. FIG. 3 shows how the LoRA technique optimizes the structure and function of the adapter (320), thereby enhancing the overall performance of the model.

The figure describes how LoRA is applied in the continual learning apparatus of the present invention, and illustrates how this technique decomposes a large weight matrix into two smaller low-rank matrices. This low-rank matrix decomposition contributes to reducing model training time.

The processor can significantly improve the overall learning efficiency of the model by substantially reducing the number of parameters in the adapter (320) through LoRA. This allows for more efficient use of computational resources by selectively updating only the necessary parts of the model instead of retraining the entire model. As a result, the model becomes capable of rapidly adapting to new tasks while preserving previously learned knowledge and integrating new information.

Since continual learning requires the model to continuously learn new tasks, efficiency is a key factor in its success. By improving parameter efficiency through LoRA, the learning apparatus can accelerate the training process for new tasks, reduce the required storage space, and mitigate overfitting issues. These enhancements allow the model to operate more responsively and effectively during the continual learning process, ultimately delivering better performance to the user.

In conclusion, the adapter (320) of the present invention, as illustrated in FIG. 3, effectively supports the continual learning process by maximizing parameter efficiency through LoRA. This approach addresses various challenges faced by larger and more complex models, providing an efficient and cost-effective learning solution that greatly expands the potential of continual learning. It offers a robust foundation that can evolve alongside advancements in technology and may have a significant impact on future continual learning applications.

Figure 4:
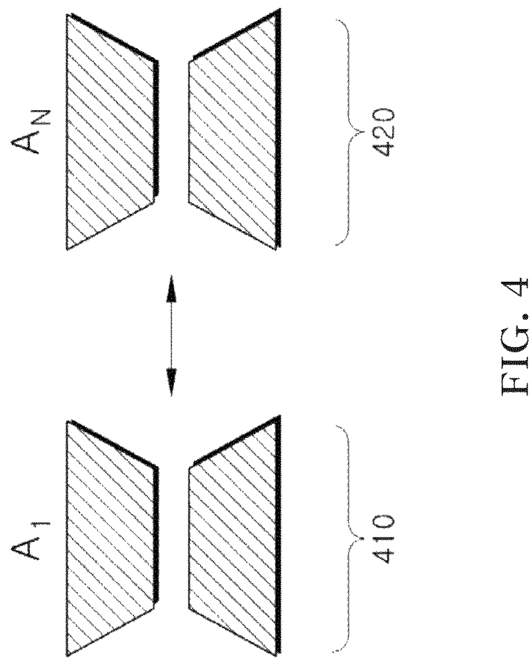
FIG. 4 is a diagram illustrating a process in which a processor applies regularization to an adapter and the resulting effects according to one embodiment of the present invention.

FIG. 4 is a diagram illustrating the process in which the processor applies regularization to adapters (410, 420) and the resulting effects, visually representing how regularization alleviates catastrophic forgetting.

The figure shows how the processor in the PMoE model applies a regularization technique to the adapters (410, 420) located in the deep layer, and explains how this process is effectively carried out. The processor applies a specific regularization method to each adapter (410, 420), thereby enabling the adapters to process different types of information independently.

Through regularization, the processor controls the learning process of the adapters (410, 420), which plays a key role in preventing previously learned knowledge from being excessively overwritten when new tasks are learned. In this process, the processor supports each adapter in maintaining independent information while effectively acquiring new knowledge.

This approach contributes to enhancing the continual learning capability of the PMoE model.

According to one embodiment of the present invention, the regularization techniques used may include L1 or L2 regularization, orthogonal loss functions, and the like.

The orthogonal loss function may be defined as follows.

$$\mathcal{L}_\theta = \theta_a^T \cdot \theta_b \quad \text{[Equation 5]}$$

Referring to Equation 5, $\theta_a$ and $\theta_b$ are parameters of the model with a magnitude (norm) of 1.

The orthogonal loss function may be defined as a regularization term that does not require input data.

In the present system, the use of such an orthogonal loss function involves computing the orthogonality between different adapters (410, 420).

Specifically, the role of this loss function in the system is to project the hidden features passing through different adapters onto distinct planes.

An equation related to this projection may be expressed as follows.

$$\mathcal{L} = \sum_{i<j} A_i \cdot A_j \quad \text{[Equation 6]}$$

Referring to Equation 2, $A_i$ and $A_j$ may represent the i-th and j-th A adapters, respectively.

In particular, the orthogonal loss function guides the information across adapters to be learned in independent directions, enabling each adapter (410, 420) to process task-specific knowledge more effectively. This technique enhances the overall learning efficiency of the model and allows the adapters to function independently without interfering with one another.

Referring to FIG. 4, one can observe the structure of adapters that effectively retain information from previous tasks even after learning new tasks. This demonstrates how regularization enables the long-term preservation of acquired knowledge within the PMoE model.

Such a regularization-based approach significantly improves the stability and reliability of the model in a continual learning environment, allowing for rapid adaptation to new tasks while maintaining previously learned knowledge.

This mechanism plays a crucial role in maximizing the continual learning capability of the PMoE model and in ensuring robust performance across diverse learning scenarios.

Meanwhile, the processor analyzes interactions among the various adapters (410, 420) located in the deep layer and computes the orthogonal loss function to ensure that each adapter processes information independently without interference from others. Through this process, the adapters learn different information independently, which contributes significantly to improving the overall efficiency and performance of the system.

The orthogonal loss function encourages the adapters to learn information in mutually independent directions, effectively making the feature vectors extracted from each adapter orthogonal to one another. This structure prevents interference during the learning processes of different adapters, allowing each adapter to handle information optimized for its corresponding task.

In addition, by computing the orthogonal loss function, the processor encourages each adapter to handle different types of input text. This allows each adapter (410, 420) to perform more specialized learning by processing distinct categories of data, thereby increasing the overall diversity and flexibility of the model.

In conclusion, the application of the orthogonal loss function, as illustrated in FIG. 4, represents a core component of the PMoE model. It plays a crucial role in improving the model's overall learning capability and adaptability by enabling the adapters to learn independently and efficiently.

This process supports the adapters (410, 420) in learning different information while functioning as part of an integrated system, allowing the model to perform various tasks effectively during continual learning without degradation in performance.

Figure 5:
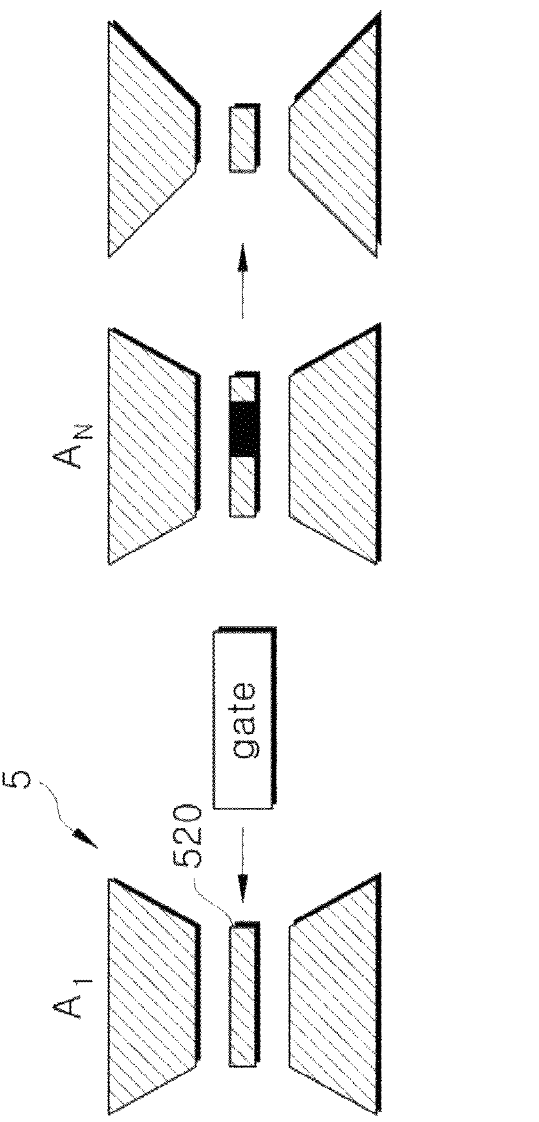
FIG. 5 is a diagram illustrating a process of automatically adjusting the capacity of adapters based on dataset characteristics using SoRA according to one embodiment of the present invention.

FIG. 5 is a diagram illustrating the process of automatically adjusting the capacity of an adapter according to the characteristics of a dataset using Sparse Low-rank Adaptation (SoRA). This figure visually represents the rank adjustment mechanism through the gate layer (520) in SoRA and precisely shows how the adapter's capacity changes flexibly depending on the dataset.

In the PMoE model, SoRA provides a key functionality that allows the capacity of the adapter (5) to be efficiently adjusted in response to diverse requirements of the dataset.

As shown in FIG. 5, the detailed operation of the SoRA technique applied to each adapter (5) can be clearly understood. SoRA is an evolved version of the existing LoRA (Low-Rank Adaptation) structure, designed by inserting a gate layer (520) between the bottleneck structure of LoRA to control the rank.

The gate layer (520) is composed of a rank-dimensional vector and is capable of performing a Hadamard product with the features passed through the lower layer of LoRA.

Meanwhile, the Hadamard product performed by the gate may be based on the following equation.

$$h = A \cdot (g \odot (B \cdot x)) \quad \text{[Equation 7]}$$

Referring to Equation 7, h may represent the forward pass of each adapter, and A and B may represent the parameters constituting the adapter. g may represent a vector in the rank dimension.

The primary function of the gate layer (520) is to deactivate specific dimensions in the rank space by setting their values to zero. This effectively reduces the rank of LoRA, thereby allowing the capacity of the adapter to be adjusted.

FIG. 5 visually illustrates how the dimensionality of LoRA is reduced depending on the number of zero values in the gate vector.

The SoRA technique analyzes the characteristics of a dataset to automatically determine and adjust the most suitable rank for each adapter. Through this process, the capacity of the adapter can be increased or decreased according to the requirements of the dataset, which plays a significant role in optimizing the overall performance and efficiency of the model.

The approach illustrated in FIG. 5 highlights the ability to flexibly adjust the adapter's capacity in response to the diversity and complexity of the dataset, thereby enabling the PMoE model to operate in a more refined and effective manner.

Figure 6A:
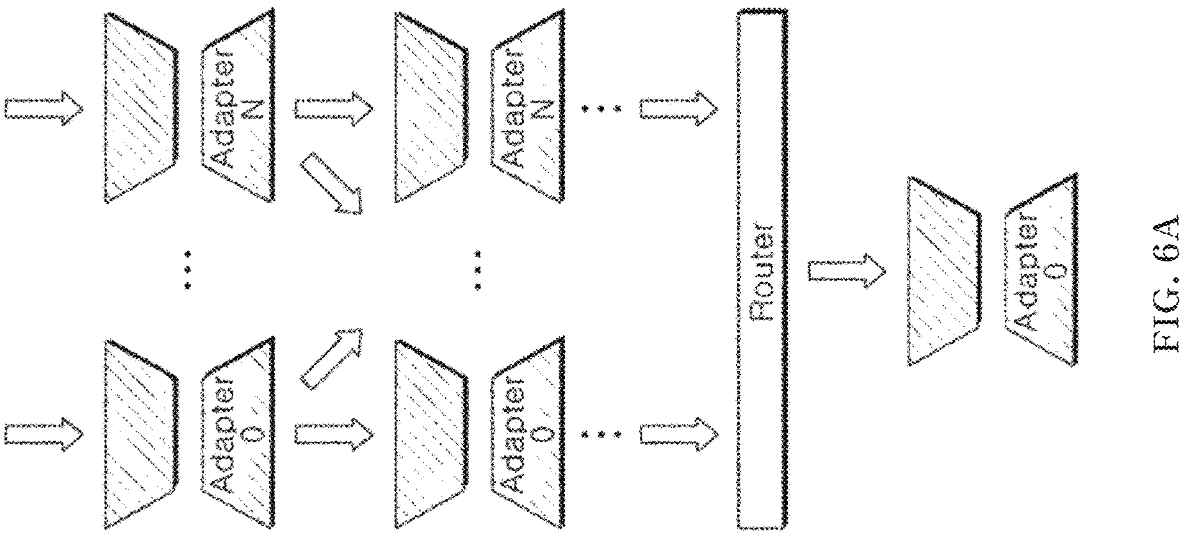
FIG. 6A and FIG. 6B are a diagram illustrating a process of adjusting gradient values and differentiating learning speeds using GDL according to one embodiment of the present invention.
Figure 6B:
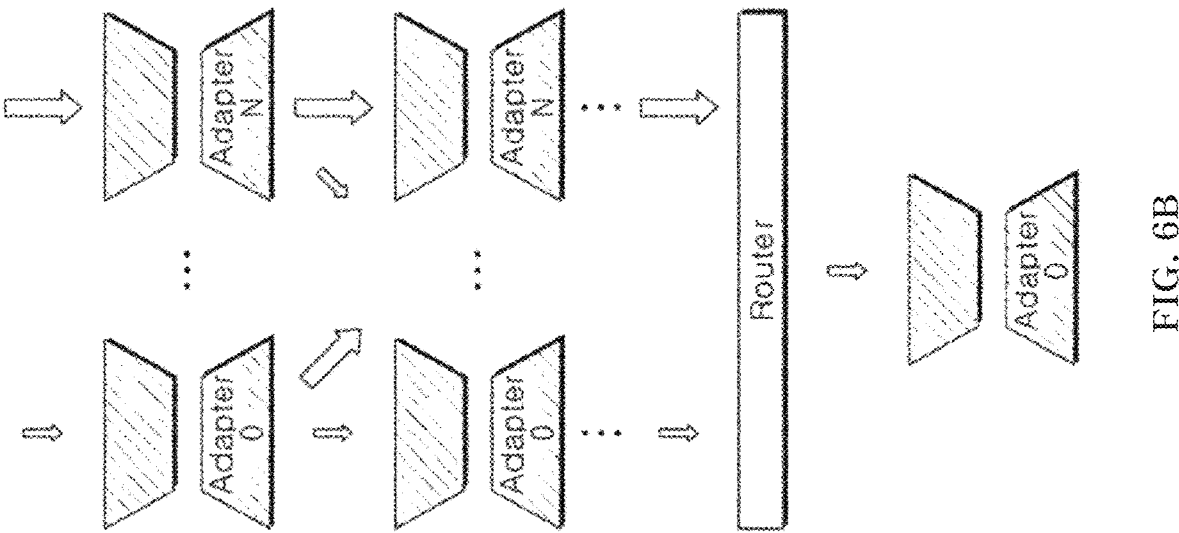

FIGS. 6A and 6B are diagrams visually illustrating the process of adjusting gradient values and differentiating learning speeds using a Gradient Decoupling Layer (GDL). These figures effectively depict how GDL suppresses updates to existing parameters while reinforcing the training of newly introduced adapters. GDL plays a crucial role in the PMoE model, particularly by focusing on reducing the update of previously learned parameters and accelerating the learning speed of newly added adapters.

According to FIGS. 6A and 6B, GDL functions by controlling the flow of backpropagated gradients between the shallow and deep layers of the network, or within the deep layer itself. Through this mechanism, gradients are selectively modulated between or within layers, which plays a critical role in the learning process.

For example, GDL can reduce the magnitude of gradient values by a specific ratio (e.g., 0.1), thereby decreasing the update strength of existing parameters. In FIG. 6B, this is visually represented by the smaller gradient arrows pointing toward the shallow layer.

By utilizing GDL, it is possible to suppress parameter updates in the shallow layer while delivering larger gradient values to the newly added adapters, thereby increasing their learning speed. In this process, GDL acts as a layer positioned between the shallow and deep layers, or within the deep layer, enabling efficient control of gradient flow and enhancing the overall learning efficiency of the network.

In other words, GDL optimizes the learning process by modulating gradient flow and contributes to improving the overall performance of the model by adjusting the update intensity of specific parameters.

Thus, GDL plays a central role within the PMoE model, functioning as a key component for controlling the flow of gradients. This structure enables more effective management of the learning process and plays an important role in enhancing both the learning speed and performance of the model. Accordingly, the use of GDL can be an essential strategy for simultaneously protecting previously learned parameters and enabling efficient learning of newly introduced adapters.

Figure 7:
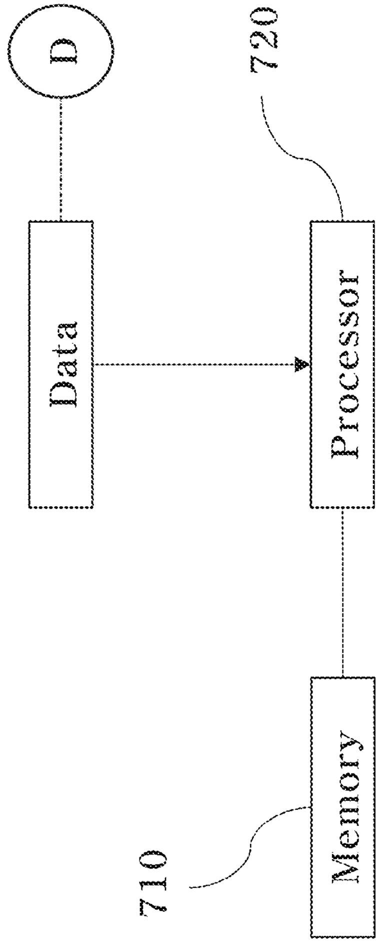
FIG. 7 is a diagram illustrating a process of performing replay using data samples of previous tasks stored in a memory according to one embodiment of the present invention.

FIG. 7 is a diagram illustrating the process of performing replay using data samples from previous tasks stored in the memory (710), visually explaining one of the core functions of the PMoE model.

As shown in FIG. 7, data samples are transferred from the memory (710) to the processor (720), and the processor utilizes these samples to retrain the model.

This process is designed to prevent the problem of "catastrophic forgetting," which frequently occurs in continual learning models—where previously acquired knowledge is lost as new information is learned.

FIG. 7 is a diagram showing how past data samples stored in the memory (710) are utilized to prevent the loss of previously acquired knowledge and to strengthen the model's continual learning capability. The figure visually represents the "replay" process, which is one of the core mechanisms of the PMoE model. The memory (710) functions as a key storage unit—similar to human memory—that retains data samples used in prior tasks. These data samples (D) help the model maintain prior knowledge during the learning of new tasks.

The processor (720) not only retrieves data samples from previous tasks stored in the memory (710) to retrain the model, but also performs this process repeatedly to reinforce learning on new tasks. This replay mechanism is essential for preserving and reinforcing previously learned knowledge while acquiring new information.

By performing replay, the processor (720) re-learns information from earlier tasks, effectively mitigating catastrophic forgetting that may occur during the learning of new tasks. Through this process, the overall performance of the model can be enhanced.

Ultimately, FIG. 7 illustrates a core mechanism that enables continual learning in the PMoE model. This process can be seen as a machine-implemented analogy to how humans periodically review previously learned content to retain memory. Such a replay process allows the model to effectively integrate new information while preserving prior knowledge, thereby achieving more robust and sustainable learning outcomes.

Figure 8:
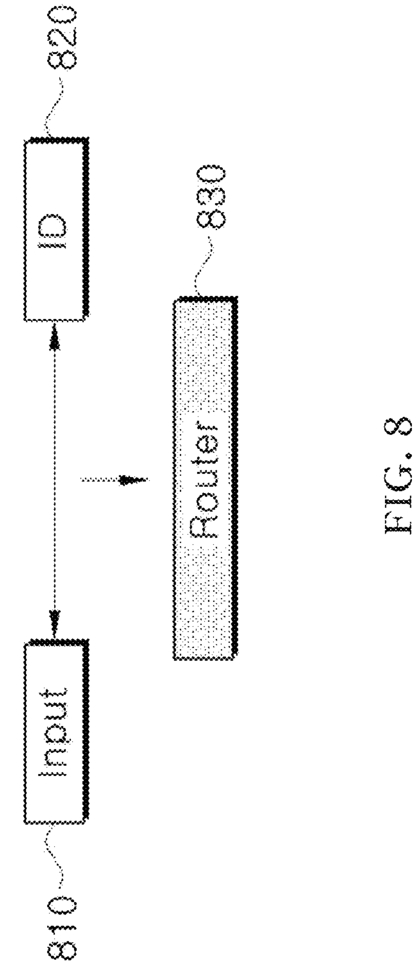
FIG. 8 is a diagram illustrating a process of calculating cross-entropy loss between input text and a task ID and using it for training a router according to one embodiment of the present invention.

FIG. 8 is a diagram illustrating the process of calculating the cross-entropy loss between input text and task ID, and using it to train the router. It shows how the processor calculates the cross-entropy loss and delivers it to the router so that the router can learn to assign the input text to the appropriate adapter.

Meanwhile, the cross-entropy loss between the input text and the task ID may be calculated based on the following equation.

$$L(x, k) = -\log G_k(x) \quad \text{[Equation 8]}$$

Referring to Equation 8, x may represent the input, and k may represent the task ID. Gx (x) may indicate the probability, determined by the router, of assigning the input x to the corresponding task ID k. L(x, k) may represent the cross-entropy loss between the input text and the task ID.

FIG. 8 focuses on the training process of the router in the PMoE model. Specifically, it visually illustrates the process in which the cross-entropy loss is calculated between the input text (810) and the corresponding task ID (820), and how this loss is used to train the router (830) to assign the input text to the appropriate adapter.

The processor may calculate a cross-entropy loss by receiving the input text and the corresponding task ID as inputs. As shown in FIG. 8, the input text (810) and task ID (820) are provided to the processor, which is configured to compute the loss value based on this information.

According to one embodiment of the present invention, the calculated cross-entropy loss may be used for training the router (830). That is, the router can improve its ability to assign input text to the correct adapter using this loss value. As illustrated in FIG. 8, the loss value computed by the processor is delivered to the router (830), which then updates its internal weights based on this value.

Through training, the router (830) analyzes the characteristics of the input text (810), predicts the task ID (820) most relevant to the input, and assigns the input text to the appropriate adapter. This process is essential for enabling the router (830) to develop the capability to identify the text's properties and make optimal adapter selection decisions.

The cross-entropy loss between the input text (810) and the task ID (820) supports this decision-making process, contributing to improved learning efficiency and enhanced overall performance of the PMoE model.

Through this process, the PMoE model can handle input text more accurately and efficiently, resulting in improved adaptability across a wide range of tasks. The interaction between the processor that calculates the cross-entropy loss and the router (830) that utilizes it for training equips the PMoE model with the capability to process more complex and diverse data.

Figure 9:
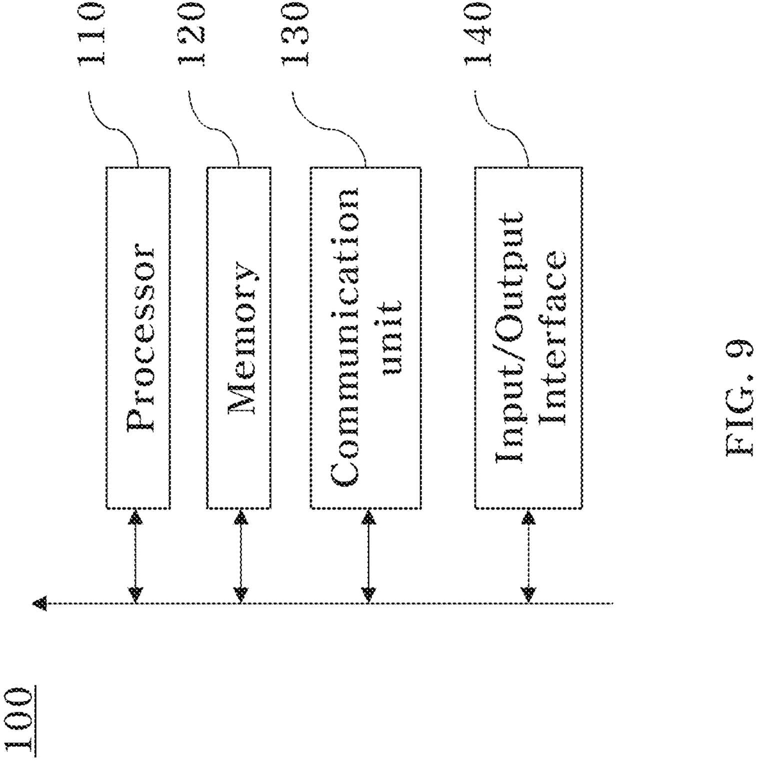
FIG. 9 is a conceptual block diagram illustrating components of a continual learning apparatus using an asymmetric structure in accordance with various embodiments of the present disclosure.

FIG. 9 is a conceptual block diagram illustrating components of a continual learning apparatus using an asymmetric structure according to various embodiments of the present disclosure.

The continual learning apparatus (100) using an asymmetric structure may include a processor (110), a memory (120), a communication unit (130), and an input/output interface (140). The internal components that may be included in the continual learning apparatus (100) are not limited to these.

The continual learning apparatus (100) of the present disclosure may also perform the functions of the processor (110) via a separate processing server or a cloud server in place of the local processor.

Referring to FIG. 9, the processor (110) may be implemented to perform operations of the continual learning apparatus (100) using an asymmetric structure by utilizing data stored in the memory (120), which stores algorithms or programs replicating such algorithms for controlling the operations of the components within the apparatus (100). In this case, the processor (110) and the memory (120) may be implemented as separate chips. Alternatively, the processor (110) and the memory (120) may be integrated into a single chip.

The processor (110) may control one or more of the components described above in combination to implement various embodiments of the present disclosure described with reference to FIGS. 1 through 8 in the continual learning apparatus (100) using an asymmetric structure.

The memory (120) according to the embodiment may store data supporting various functions of the continual learning apparatus (100) using an asymmetric structure, as well as programs for operating the processor (110). It may also store input/output data (e.g., images, videos), multiple application programs executed on the continual learning apparatus (100), data for operating the apparatus, and instructions. At least some of these application programs may be downloaded from an external server via wireless communication.

The memory (120) may include at least one type of storage medium such as: flash memory type, hard disk type, solid state disk (SSD) type, silicon disk drive (SDD) type, multimedia card micro type, card-type memory (e.g., SD or XD memory), random access memory (RAM), static RAM (SRAM), read-only memory (ROM), electrically erasable programmable ROM (EEPROM), programmable ROM (PROM), magnetic memory, magnetic disk, and optical disk.

Furthermore, the memory may be a database that is physically separate from the continual learning apparatus (100) but connected to it via a wired or wireless interface.

The communication unit (130) according to the embodiment may include one or more components that enable communication with external devices. For example, it may include at least one of a broadcast reception module, a wired communication module, a wireless communication module, a short-range communication module, and a location information module.

The wired communication module may include various types of wired communication interfaces such as a Local Area Network (LAN) module, a Wide Area Network (WAN) module, or a Value Added Network (VAN) module. It may also include various cable-based communication interfaces such as USB (Universal Serial Bus), HDMI (High Definition Multimedia Interface), DVI (Digital Visual Interface), RS-232 (Recommended Standard 232), power line communication, or POTS (Plain Old Telephone Service).

The wireless communication module may include not only a Wi-Fi module and a Wireless Broadband (WiBro) module, but also wireless communication modules supporting various communication standards such as GSM (Global System for Mobile Communication), CDMA (Code Division Multiple Access), WCDMA (Wideband Code Division Multiple Access), UMTS (Universal Mobile Telecommunications System), TDMA (Time Division Multiple Access), LTE (Long Term Evolution), 4G, 5G, and 6G.

The short-range communication module is intended for short-range communication and may support communication using at least one of the following technologies: Bluetooth, RFID (Radio Frequency Identification), infrared communication (IrDA; Infrared Data Association), UWB (Ultra Wideband), ZigBee, NFC (Near Field Communication), Wi-Fi (Wireless Fidelity), Wi-Fi Direct, and Wireless USB (Wireless Universal Serial Bus).

The input/output interface (140) according to the embodiment serves as a communication channel with various types of external devices connected to the continual learning apparatus (100) using an asymmetric structure. The input/output interface (140) may include at least one of a wired/wireless headset port, external charger port, wired/wireless data port, memory card port, a port for connecting a device equipped with an identification module (SIM), audio input/output port, video input/output port, and earphone port. The continual learning apparatus (100) of the present disclosure may perform appropriate control related to external devices connected through the input/output interface (140).

In correspondence with the performance of the components shown in FIG. 9, at least one component may be added or omitted. In addition, the relative positions of the components may be modified depending on the performance or structure of the apparatus, which will be readily understood by those skilled in the art.

Meanwhile, each of the components shown in FIG. 9 represents a software component and/or a hardware component such as a Field Programmable Gate Array (FPGA) or an Application Specific Integrated Circuit (ASIC).

As a result, such interactions improve the model's accuracy and responsiveness and, in particular, enhance the model's capability to process tasks in highly dynamic environments.

The disclosed embodiments may be implemented in the form of a computer-readable recording medium storing instructions executable by a computer. The instructions may be stored in the form of program code, and when executed by a processor, may generate program modules to perform the operations of the disclosed embodiments.

The recording medium may be implemented as a computer-readable medium. A computer-readable medium includes all types of media that store instructions that can be decoded by a computer, such as read-only memory (ROM), random access memory (RAM), magnetic tapes, magnetic disks, flash memory, and optical data storage devices.

As described above, the disclosed embodiments have been described with reference to the accompanying drawings. However, those skilled in the art will appreciate that the present disclosure may be implemented in different forms without changing the essential characteristics or technical spirit of the disclosure. The disclosed embodiments are illustrative and should not be construed as limiting.

What is claimed is:

1. A continual learning apparatus using an asymmetric structure, the continual learning apparatus comprising:

a memory configured to store a dataset, model parameters, a router, and adapters used for continual learning; and at least one processor configured to communicate with the memory, wherein the at least one processor is configured to:

perform continual learning using a neural network model comprising retaining general knowledge or content learned from previous tasks within a shallow layer and learning task-specific knowledge for new tasks within a deep layer, add an adapter corresponding to new learning to the deep layer whenever new data is learned, distribute input text to at least one of the shallow layer, and the deep layer, wherein the shallow layer performs the retaining by processing the previous tasks, the deep layer performs the learning by processing distinct categories of data, and the adapter via the router is provided between the shallow layer and the deep layer, perform regularization on the adapter to improve learning efficiency of the neural network model, perform the regularization using an orthogonal loss function to maintain independence of information between different adapters, perform the regularization using the orthogonal loss function by calculating orthogonality between output data of different adapters and projecting the output data onto different planes, perform Sparse Low-rank Adaptation (SoRA) based on a gate vector provided between the adapters, and determine a capacity of each of the adapters based on characteristics of the input text, wherein the gate vector is composed of a vector in a rank dimension, wherein the gate vector adjusts the rank by performing a Hadamard product with a feature vector that has passed through a predetermined layer, wherein the orthogonal loss function is determined by Equation I as follows:

$$\mathcal{L} = \sum_{i<j} A_i \cdot A_j \quad \text{[Equation 1]}$$

where L denotes a loss function, and $A_i$ and $A_j$ denote an i-th and a j-th A adapter, respectively, wherein the Hadamard product is performed based on Equation 2 as follows:

$$h = A \cdot (g \odot (B \cdot x)) \quad \text{[Equation 2]}$$

where h represents a forward pass of each adapter, A and B represent parameters constituting each adapter, g represents the vector in the rank dimension, and x represents the feature vector that has passed through the predetermined layer, wherein the at least one processor is configured to:

determine a cross-entropy loss between the input text and a corresponding task identifier (ID) based on Equation 8 as follows:

$$L(x, k) = -\log G_k(x) \quad \text{[Equation 8]}$$

where x represents an input, k represents the task ID, $G_k(x)$ indicates a probability, determined by the router, of assigning the input x to the corresponding task ID k, and L(x, k) represents the cross-entropy loss between the input text and the corresponding task ID; and train the router to update internal weights of the router and assign the input text to the adapter, based on the cross-entropy loss, wherein the router is configured to:

analyze the characteristics of the input text;

predict the task ID that is most relevant to the input text; and assign the input text to the adapter that corresponds to the input text, and wherein the adapters are configured to process different types of input texts independently.

2. The continual learning apparatus using the asymmetric structure of claim 1, wherein the at least one processor is configured to: distribute the input text based on a feature corresponding to the deep layer via the router.

3. The continual learning apparatus using the asymmetric structure of claim 1, wherein the at least one processor is configured to: improve parameter efficiency by using Low-Rank Adaptation (LoRA) through the adapter provided in the deep layer and using at least one portion of the neural network model.

4. The continual learning apparatus using the asymmetric structure of claim 1, wherein the at least one processor is configured to: increase a learning speed of an added adapter by adjusting an update of parameters learned prior to a reference point at a predetermined ratio using a Gradient Decoupling Layer (GDL).

5. The continual learning apparatus using the asymmetric structure of claim 1, wherein the at least one processor is configured to: store data samples from tasks prior to a reference point in the memory, and perform replay based on the data samples.

6. A method of a continual learning using an asymmetric structure, the method comprising:

storing a dataset, model parameters, a router, and adapters used for continual learning;

performing the continual learning using a neural network model comprising retaining general knowledge or content learned from previous tasks within a shallow layer and learning task-specific knowledge for new tasks within a deep layer;

wherein the performing the continual learning comprises:

adding an adapter corresponding to new learning to the deep layer whenever new data is learned; and distributing input text to at least one of the shallow layer, and the deep layer, wherein the shallow layer performs the retaining by processing the previous tasks, the deep layer performs the learning by processing distinct categories of data, and the adapter via the router is provided between the shallow layer and the deep layer, performing regularization on the adapter to improve learning efficiency of the neural network model;

performing the regularization using an orthogonal loss function to maintain independence of information between different adapters;

performing the regularization using the orthogonal loss function by calculating orthogonality between output data of different adapters and projecting the output data onto different planes;

performing Sparse Low-rank Adaptation (SoRA) based on a gate vector provided between the adapters; and determining a capacity of each of the adapters based on characteristics of the input text, wherein the gate vector is composed of a vector in a rank dimension, wherein the gate vector adjusts the rank by performing a Hadamard product with a feature vector that has passed through a predetermined layer, wherein the orthogonal loss function is determined by Equation 1 as follows:

$$\mathcal{L} = \sum_{i<j} A_i \cdot A_j \quad \text{[Equation 1]}$$

where L denotes a loss function, and $A_i$ and $A_j$ denote an i-th and a j-th A adapter, respectively, wherein the Hadamard product is performed based on Equation 2 as follows:

$$h = A \cdot (g \odot (B \cdot x)) \quad \text{[Equation 2]}$$

where h represents a forward pass of each adapter, A and B represent parameters constituting each adapter, g represents the vector in the rank dimension, and x represents the feature vector that has passed through the predetermined layer, wherein the performing the continual learning further comprises:

determining a cross-entropy loss between the input text and a corresponding task identifier (ID) based on Equation 8 as follows:

$$L(x, k) = -\log G_k(x) \quad \text{[Equation 8]}$$

where x represents an input, k represents the task ID, $G_k(x)$ indicates a probability, determined by the router, of assigning the input x to the corresponding task ID k, and L(x, k) represents the cross-entropy loss between the input text and the corresponding task ID; and training the router to update internal weights of the router and assign the input text to the adapter, based on the cross-entropy loss, wherein the training comprises:

analyzing, by the router, the characteristics of the input text;

predicting, by the router, the task ID that is most relevant to the input text;

assigning, by the router, the input text to the adapter that corresponds to the input text; and processing, by the adapters, different types of input texts independently.

7. The method of claim 6, further comprising: distributing the input text based on a feature corresponding to the deep layer via the router.

8. The method of claim 6, further comprising: increasing a learning speed of an added adapter by adjusting the update of parameters learned prior to a reference point at a predetermined ratio using a Gradient Decoupling Layer (GDL).

* * * * *